United States Patent [19]

Blesing

[11] Patent Number: 5,662,173

[45] Date of Patent: Sep. 2, 1997

[54] ROLLING CULTIVATOR

[76] Inventor: Edward David Blesing, Bangor, Via Wirrabara, State of South Australia, Australia

[21] Appl. No.: 615,310

[22] PCT Filed: Sep. 14, 1994

[86] PCT No.: PCT/AU94/00542

§ 371 Date: Mar. 15, 1996

§ 102(e) Date: Mar. 15, 1996

[87] PCT Pub. No.: WO95/07605

PCT Pub. Date: Mar. 23, 1995

[30] Foreign Application Priority Data

Sep. 15, 1993 [AU] Australia ................... PM1223

[51] Int. Cl.⁶ ................ A01B 21/04; A01B 33/10
[52] U.S. Cl. ............ 172/526; 172/612; 172/537; 172/543
[58] Field of Search ............ 111/133, 52; 172/49.5, 172/68, 112, 142, 177, 413, 509, 519, 520, 521, 522, 523, 524, 525, 526, 611, 612, 776, 536, 537, 543; 460/114

[56] References Cited

U.S. PATENT DOCUMENTS

| 268,915 | 12/1882 | Lymburner | 172/612 |
|---|---|---|---|
| 337,480 | 3/1886 | Clay | 172/612 X |
| 2,912,055 | 11/1959 | Buddingh et al. | |
| 3,212,585 | 10/1965 | Bezzerides | 172/142 |
| 3,310,122 | 3/1967 | Mack | |
| 3,494,428 | 2/1970 | Aitkinhead | |
| 4,005,756 | 2/1977 | Morse, Jr. | 172/142 X |
| 4,109,731 | 8/1978 | van der Lely | 172/49.5 |
| 4,423,787 | 1/1984 | Steinberg | |
| 4,582,142 | 4/1986 | Bridge | |
| 5,074,363 | 12/1991 | Boucton et al. | 172/520 |

FOREIGN PATENT DOCUMENTS

| 262530 | 12/1963 | Australia. |
|---|---|---|
| 20673/83 | 5/1984 | Australia. |
| 43074/85 | 12/1985 | Australia. |
| 49499/85 | 5/1986 | Australia. |
| 54342/86 | 9/1986 | Australia. |
| 73114/87 | 11/1987 | Australia. |
| 75859/87 | 1/1988 | Australia. |
| 75561/87 | 1/1988 | Australia. |
| 86027/91 | 6/1992 | Australia. |
| 939226 | 10/1963 | United Kingdom. |
| 1023852 | 3/1966 | United Kingdom. |

OTHER PUBLICATIONS

SU, 1653559 (Chernigova Agric) 7 Jun. 1991, Figs. 1–5.

Primary Examiner—Terry Lee Melius
Assistant Examiner—Robert Pezzuto
Attorney, Agent, or Firm—Evenson, McKeown, Edwards & Lenahan P.L.L.C.

[57] ABSTRACT

An elongate cultivating tool adapted to be supported at each end so as to be able in use to rotate about a longitudinal axis. The cultivating tool comprises an elongate cylindrical support which may be a helical coil spring, a plurality of cultivating elements on a peripheral cylindrical surface of the cylindrical support, each cultivating element linking up with four other like cultivating elements on the peripheral cylindrical surface and one and preferably two tines extending from each cultivating element. There may be two banks of cultivating elements on the tool to give a greater number of tines on the tool. The axle to support the cylindrical support for rotation may be telescopic to provide tension to maintain the position of the cultivating elements. The cultivating elements are formed from metal rod and in one form comprise a U-shaped body with each leg of the U-shaped body including a bend out of the plane of the body with each portion beyond the bend comprising a tine. In another form the elements comprise a circular loop portion, two tangential legs extending from the loop portion and crossing each other and each leg including a bend out of the plane of the loop portion beyond the crossing with each portion of the leg beyond the bend comprising the tine.

17 Claims, 10 Drawing Sheets

ROLLING CULTIVATOR

FIELD OF INVENTION

This invention relates to an implement suitable as a cultivator for agricultural ground working and more particularly to a cultivator adapted to roll.

The invention will be generally discussed in relation to its use as a agricultural implement but it is to be realised that it is not restricted to that use. For instance the device may be adapted to be used as a ground roller for compacting ground.

BACKGROUND OF THE INVENTION

Cultivators am used to cultivate ground but with a move to trash farming or farming in which stubble and straw is left on the ground then cultivators which are normally dragged across the ground get easily clogged with such straw and stubble and become ineffective. Prickle chain harrows which consist essentially of a chain with a number of spikes extending from it which are dragged across the ground at an angle to transverse to the direction of travel of the cultivator to give a rolling motion provide a degree of cultivation but the tines can easily get blocked up with trash. Further, the weight of such a chain can be insufficient to cause sufficient ground working for suitable cultivation in some types of soils.

Australian Patent specification No. 612,585 published 21 st Jan. 1988 discloses a ground working tool which has groups of tool elements connected longitudinally together to form a chain which when held in tension form a prickle chain. Each tool element has at least one tine extending radially out from it. Although there are significant advantages in having a chain system in which an assembly is made up of a series of replaceable links there are several problems with the system disclosed. A first problem is that the number of tool elements in each group is restricted to two or three because they need to touch each other to provide mutual support and any greater number would form an unstable group which would collapse under conditions of use. Other problems which exist are that the total weight of the chain is insufficient to provide ground working in other than quite light soils and the maximum possible diameter does not allow for good ground entry, track of cultivation and trash clearance. Extending the lengths of the tines to give a greater diameter is impractical because longer tines are liable to break.

It is the object of this invention to provide an implement suitable as a rolling or rotating type cultivator which can have a greater overall diameter than existing prickle chain harrows and hence will not catch so much trash and which can have sufficient weight to provide good cultivation.

BRIEF SUMMARY OF THE INVENTION

In one form therefore the invention is said to reside in an elongate ground working implement adapted to be supported at each end thereof so as to be able in use to rotate about a longitudinal axis thereof, wherein the ground working implement comprises an elongate cylindrical support, a plurality of cultivating elements on a peripheral cylindrical surface of the cylindrical support, each cultivating element including means to link up with other like cultivating elements on the peripheral cylindrical surface and at least one tine extending from each cultivating element and means to support the cylindrical support on the longitudinal axis for rotation thereabouts.

It will be seen that by this invention there is provided a ground working implement or cultivator which comprises a cylindrical support with a number of cultivating elements on the surface of and extending out from it and which can be dragged along the ground with a rolling type motion to cause cultivation.

If the ground working implement or cultivator is drawn along the ground with the longitudinal axis of the cylindrical support at an angle to transverse to the direction of motion then the cultivating elements or tines will effect cultivation of the ground over which it is drawn. This is because each tine of the cultivating elements does not just enter the ground and leave the ground but is drawn sideways while it is in the ground so giving cultivation by displacement of soil.

Effectively the ground working implement or cultivator is a cylindrical support with a chain mail type assembly of cultivating elements over the surface with each of the elements of the chain mail having at least one tine.

The cylindrical support is preferably flexible or resilient in its longitudinal direction so as to provide a degree of ground following in rough or sloping terrain and also preferably the cylindrical support is a weight to assist with providing good cultivation by pushing each tine a sufficient depth into the ground.

In one preferred embodiment the cylindrical support is a helical coil spring.

Preferably the coils of the coil spring are made from flat bar used on the flat so the cylindrical surface provides a surface which gives a degree of support for the cultivating elements. The number of coils and the spacing between the coils of the coil spring can assist to provide this support surface.

Each of the cultivating elements is not fastened to the surface of the cylindrical support such as the coiled spring but each cultivating element is interconnected with its adjacent cultivating elements to provide an integral assembly over the peripheral cylindrical surface of the coil spring.

Other forms of cylindrical support with flexibility and resiliency may also be used.

The cylindrical support may have an axle with the cylindrical support mounted at its ends to the axle so that the body between the ends is free to flex during ground following during operation. The axle may include means such as spring loaded telescoping to allow for the application of tension to the cultivating element assembly to hold the cultivating elements together. The amount of spring tension will vary the tension in the cultivating elements and hence the degree of flexibility of the assembly as a whole. If it is desired to have a looser cultivating tool for better ground following then the spring tension may be reduced.

Other forms of tensioning such as a spring loaded chassis upon which the ground working tool is carried may be used to provide tension to the assembly of cultivating elements.

In a preferred embodiment of the invention each of the cultivating elements is interconnected with four adjacent cultivating elements around the circumference of the cylindrical support and along the length of the cylindrical support to provide an integral structure of cultivating elements over the peripheral cylindrical surface of the cylindrical support.

There may be end assemblies at each end of the cylindrical support, the end assemblies including means to retain the first and last groups of cultivating elements.

In one preferred embodiment of the invention, each cultivating element may be formed from a metal rod and have a substantially U-shaped body comprising a base and two side legs extending from the base with each leg of the U-shaped body including a bend out of the plane of the U-shaped body so that each portion beyond the bend comprises the tine. Hence, for this embodiment there are two tines per element. The angle of the bend may be from an acute angle to a right angle.

Preferably each leg of the U-shaped body is slightly closer together at the tine end than at the base end. This is because when they are assembled onto a cylindrical support the circumference at the radial distance of the base which is raised by the thickness of the rod from the cylindrical support is greater than the radial distance at the tine end which rests on to the cylindrical support.

In a preferred embodiment of the invention, the base of each of the U shaped cultivating elements may be bent slightly out of the plane of the U shaped element to give a recess under the base into which the tine of the next element fits. This provides a substantially flat undersurface of the linked elements to engage against the peripheral cylindrical surface of the cylindrical support and allows the leg of an adjacent tine to fit under the base.

The connection between the adjacent cultivating elements may be by the base of a tine hooking into one corner of the base of the next longitudinal element. The next circumferential element has a base of a tine which hooks into the other side of the base of the U-shaped portion of the tine.

By this means, cultivating elements may be linked onto adjacent cultivating elements sequentially down the length and around the circumference of the cylindrical support to provide the chain mail type assembly on the surface of the finished rolling cultivator.

In an alternative form each cultivating element is formed from a metal rod and comprises a circular loop portion, two tangential legs extending from the loop portion and crossing each other and with each leg including a right angled bend out of the plane of the loop portion beyond the crossing point with each portion of the leg beyond the bend comprising the tine. The connection between adjacent cultivating elements of this embodiment is by one leg each of two adjacent cultivating elements passing under the circular loop portion and its tine extending up inside the circular portion. Once again a chain mail type assembly is obtained around the circumference and along the length of the cylindrical support.

In an alternative form of the elongate ground working implement of the present invention the plurality of cultivating elements on the peripheral cylindrical surface of the cylindrical support may comprise a double bank of cultivating elements so as to provide more ground working tines extending from the tool.

In such an embodiment each cultivating element may be substantially U-shaped with each leg of the U-shaped portion including a right angled bend out of the plane of the U-shaped portion with each portion beyond the bend comprising the tine and wherein a base portion of the substantially U-shaped portion cultivating element is bent out of the plane of the U-shaped portion so as to allow legs of an adjacent cultivating element of both banks of cultivating elements to pass underneath it when mounted onto the cylindrical support.

There may be from four to ten or more cultivating elements in each bank of cultivating elements around the circumference of the cylindrical support at one position along the length of the of the cylindrical support.

The cylindrical support may have a diameter of perhaps 200 to 500 mm and each cultivating element may have a tine length of perhaps 200 to 300 mm.

This gives an overall diameter of the rolling cultivator according to this invention of from 600 mm up to over 1000 mm. With the cylindrical support having a diameter of 350 mm there may be eight cultivating elements around the circumference of the cylindrical support at one position along the length of the of the cylindrical support and this will give 16 tines extending out from the surface. Each tine may be slightly splayed out sideways from its opposing tine on the cultivating element so that the tines extend substantially radially with respect to the cylindrical support. Other numbers of cultivating elements such as from four to ten or more cultivating elements around the circumference of the cylindrical support at one position along the length of the of the cylindrical support may also be used.

It will be noted that with a diameter of up to 1000 mm that as each tine leaves the ground after cultivation it does so while it is still pointing substantially downwards such that it clears well of trash. In a much smaller diameter cultivator as for instance the prickle chain harrows the angle at which the tines leave the ground is much greater and hence can lift trash up to an extent that it can tangle with the tines and clog them.

With a larger diameter as provided by the cylindrical support of the present invention there may occur a greater rotational speed of the tips of the which will also assist with clearing of trash.

The cylindrical support may be mounted to a chassis with one end fixed for rotation about the longitudinal axis of the cylindrical support and the other end mounted to the chassis for rotation about the longitudinal axis of the cylindrical support and also to flex to allow for ground following during operation. The angle at which the rolling cultivator is dragged along the ground during use may be adapted to be varied so as to give various degrees of cultivation. The angle may be from transverse to the direction of travel of the implement to which the ground working tool is mounted up to about 45° to 50° to transverse to the angle of travel.

There may be two or more ground working tools according to this invention mounted to a chassis to give a wide swathe of cultivation. The chassis may include means to fold the tools into a central transport position.

For the application of this invention to devices other than agricultural equipment then the diameter of the cylindrical support, the number of cultivating elements and the length of the tines may be varied. For instance in the construction of a earth compactor of the type known as a sheep's foot roller the device of the present invention may have a diameter of the cylindrical support of up to two meters, up to sixty tines around the circumference and a tine length of 100 mm. Such a roller would be rolled straight along the ground rather than at an angle.

This then generally describes the invention, but to assist with understanding reference will now be made to the accompanying drawings which show a preferred embodiment of the invention.

DETAILED DESCRIPTION

Figure 1:
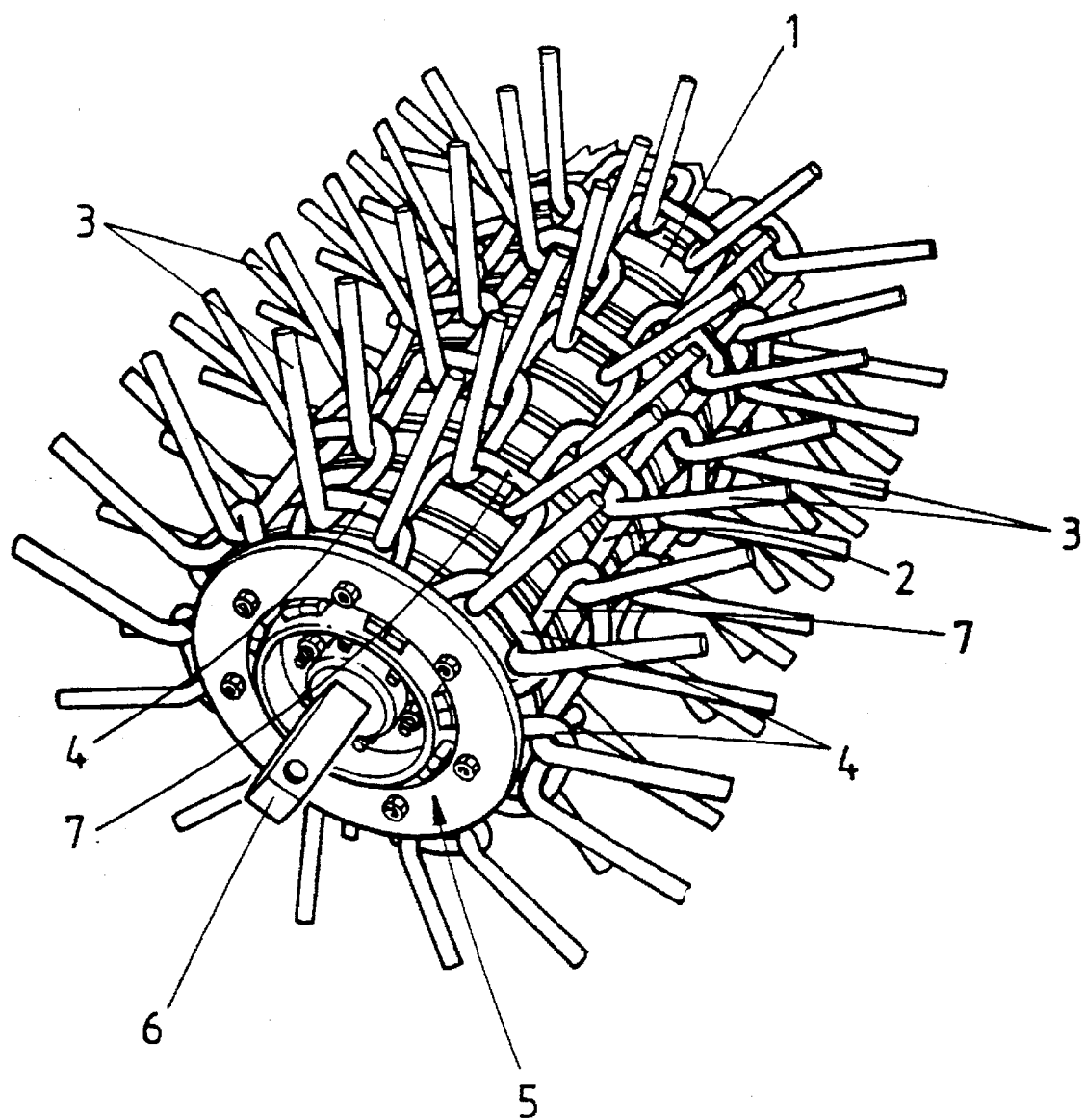
Figure 2:
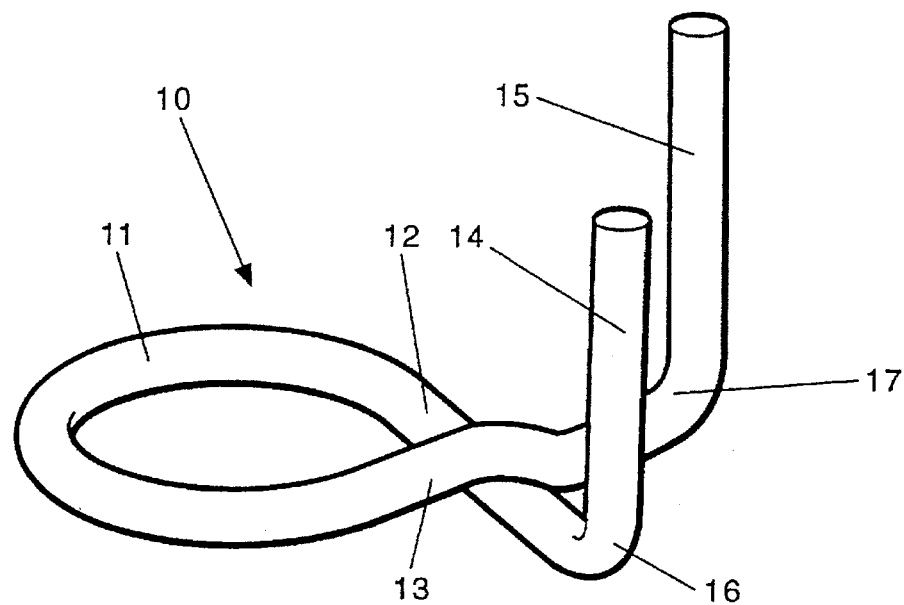
Figure 3:
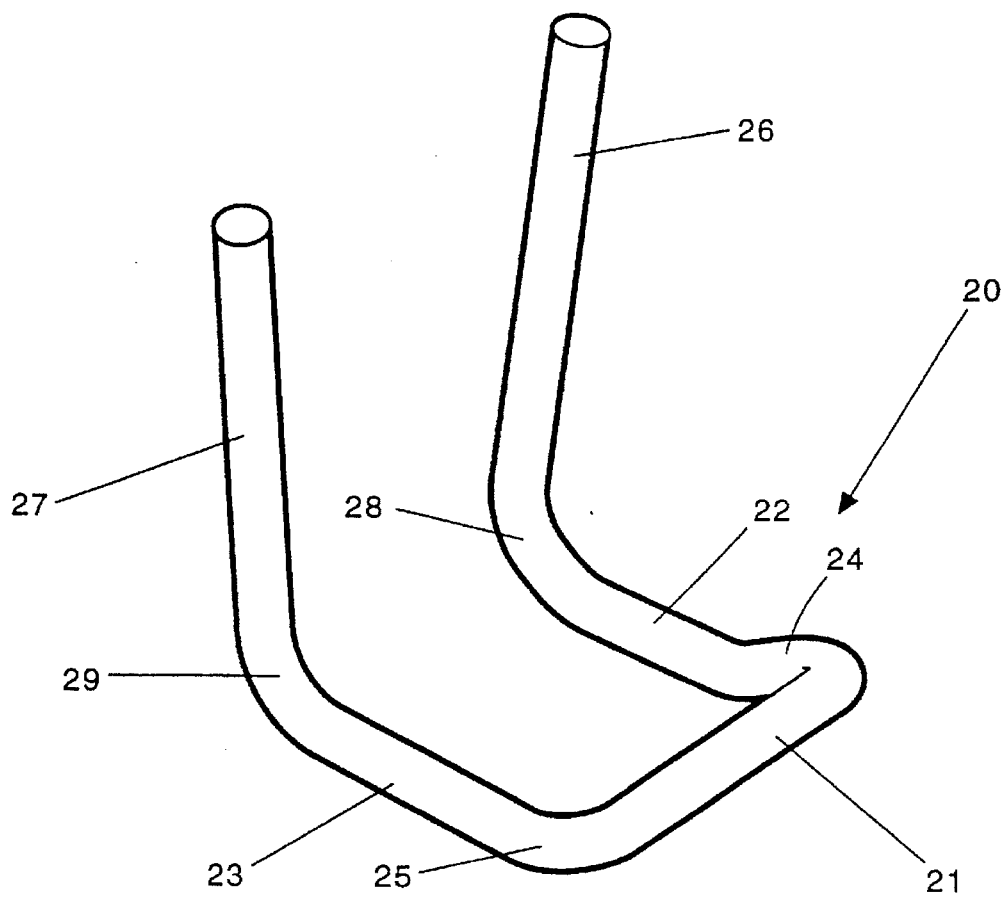
Figure 4:
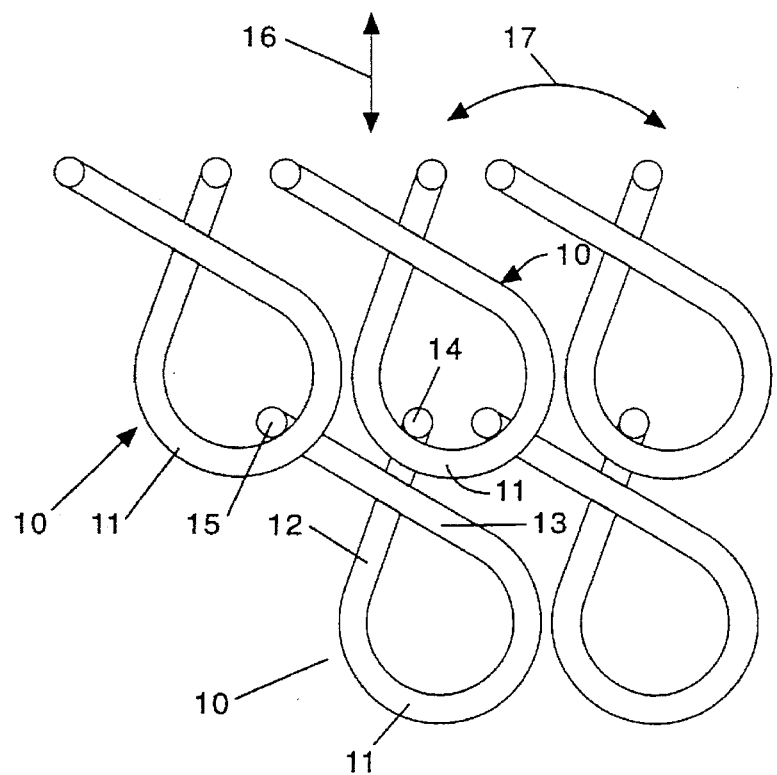
Figure 5:
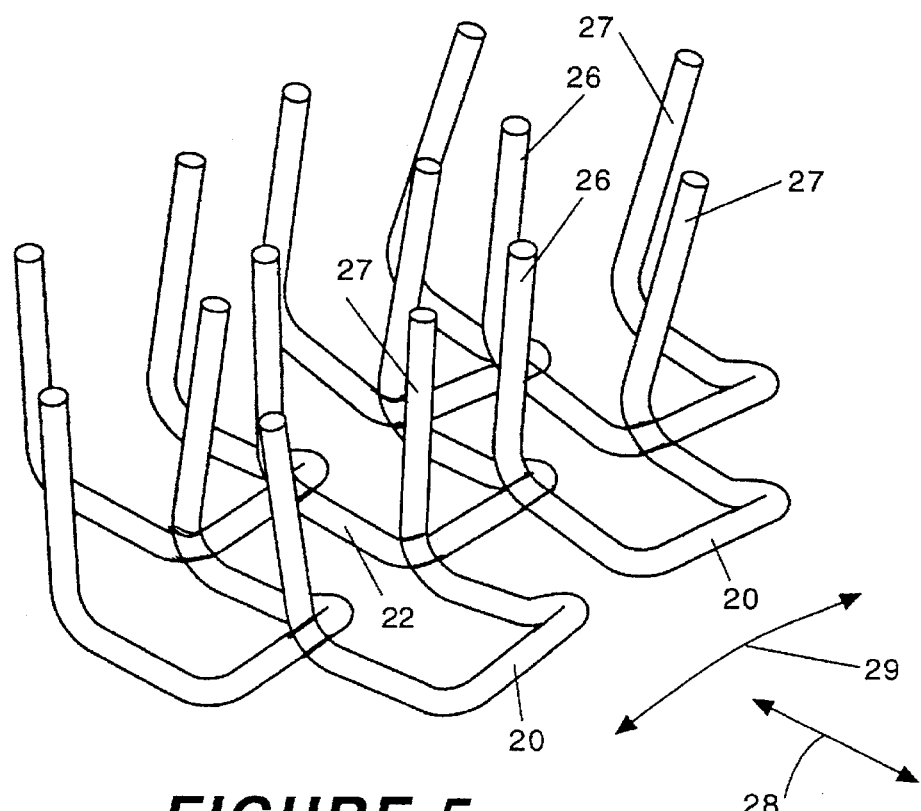
Figure 6:
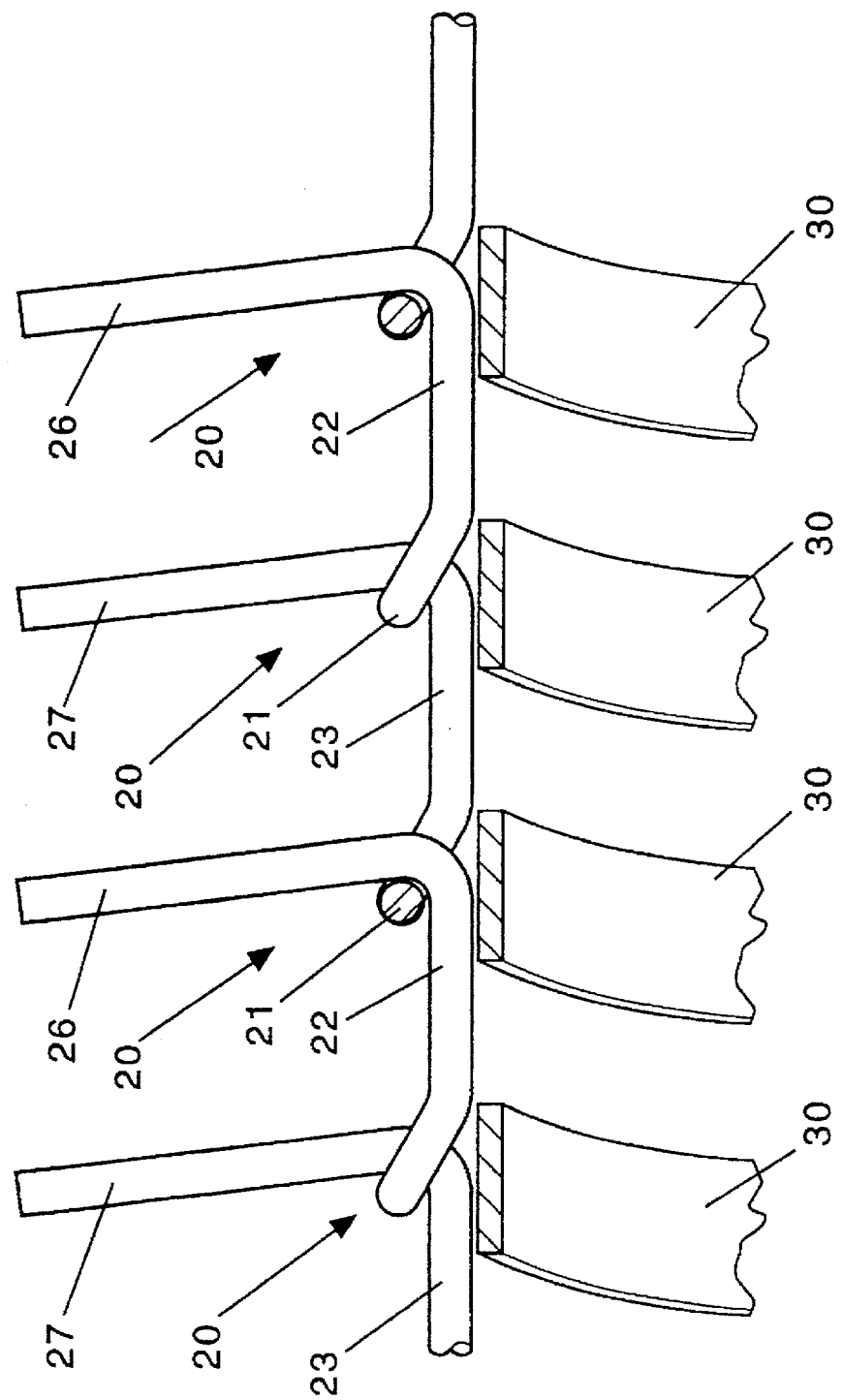
Figure 7:
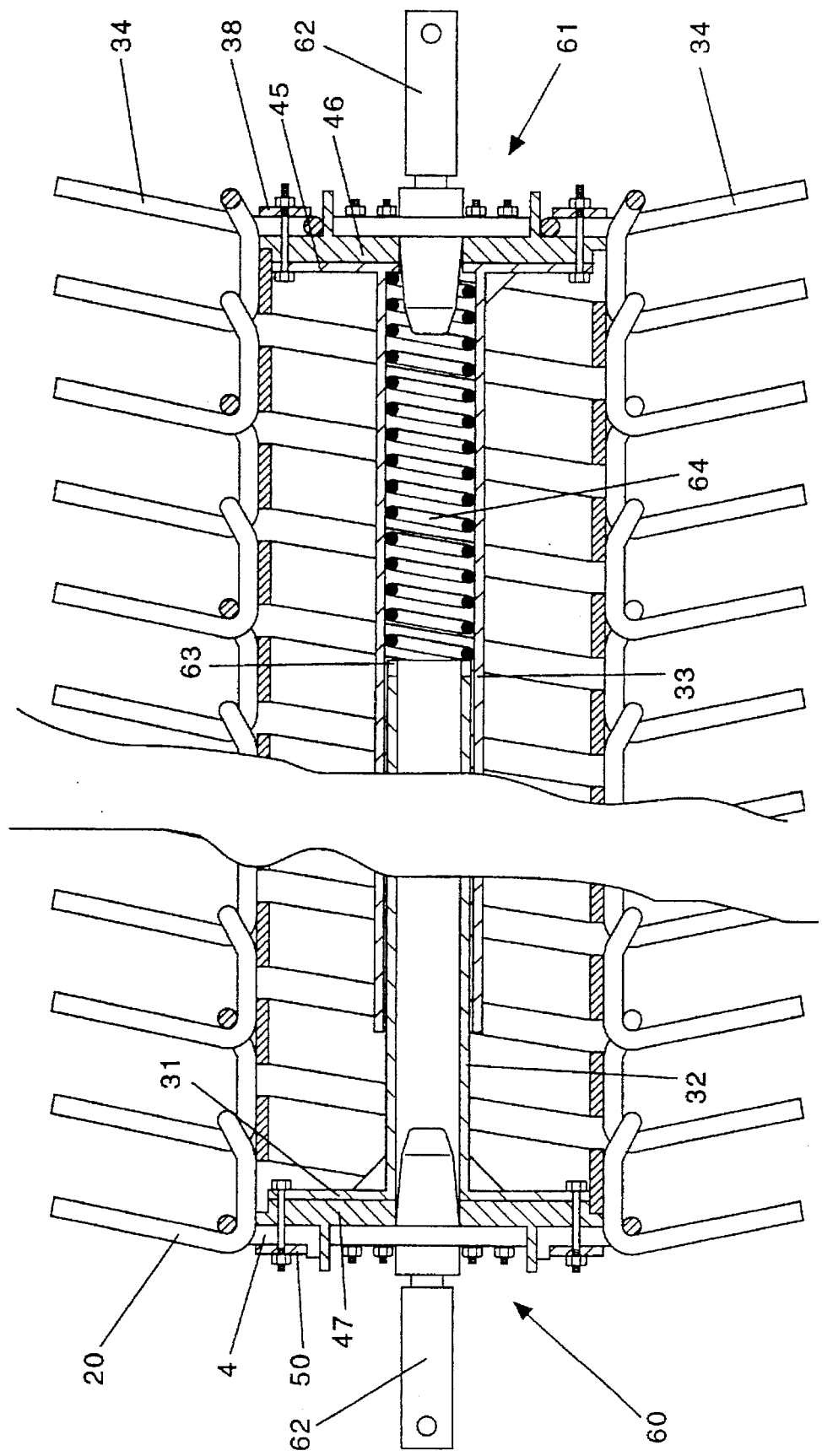
Figure 8:
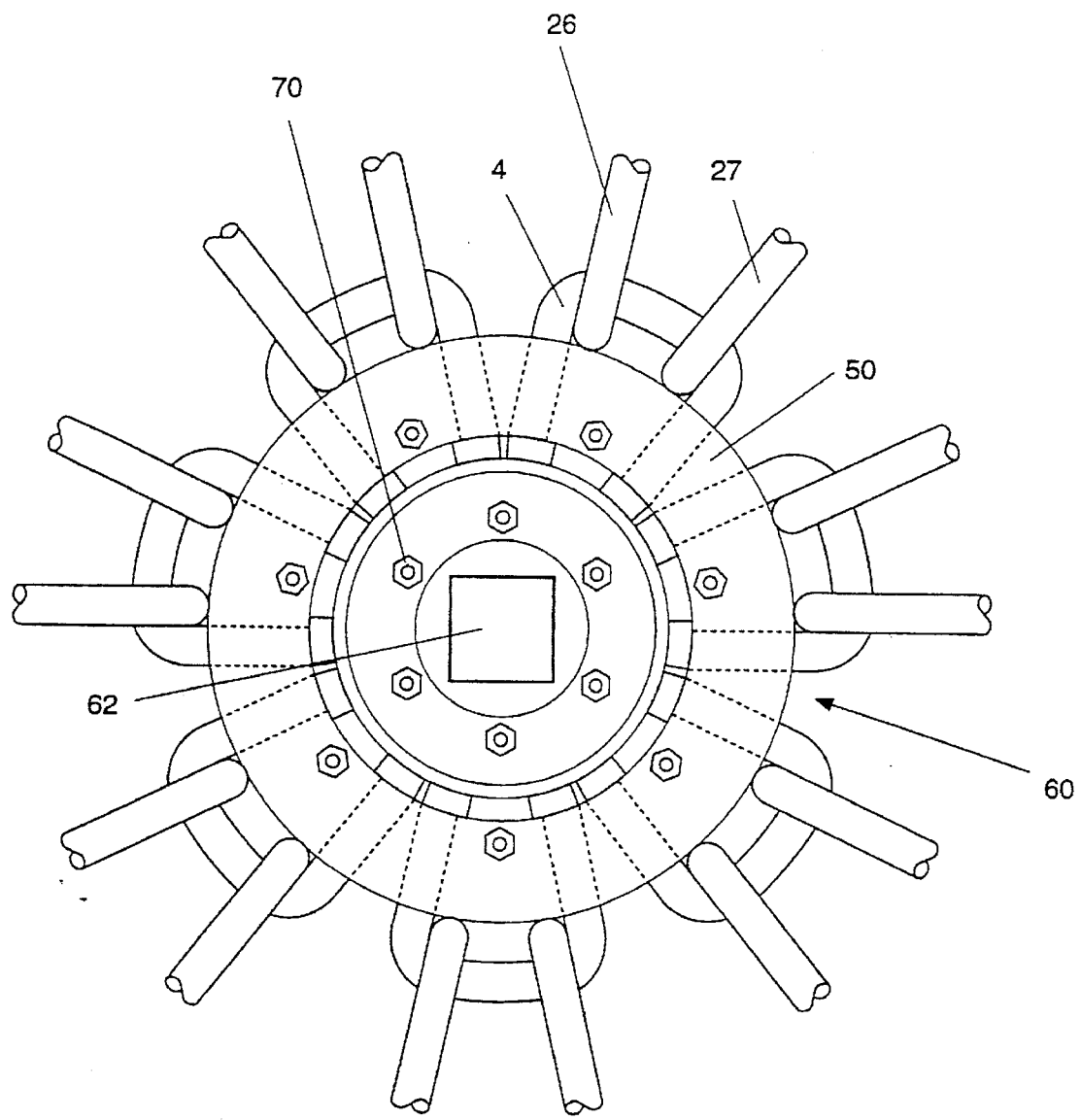
Figure 9:
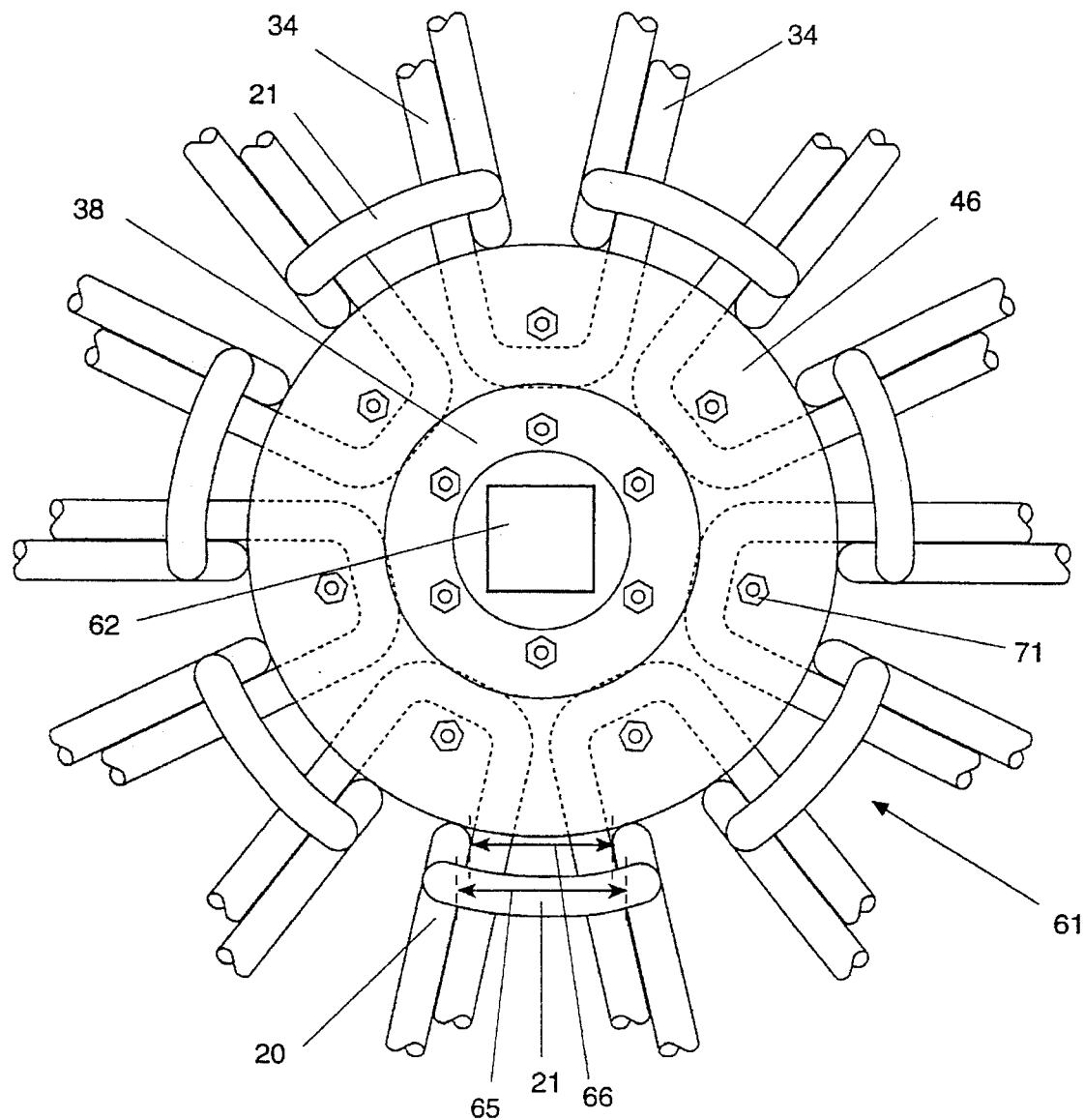
Figure 10:
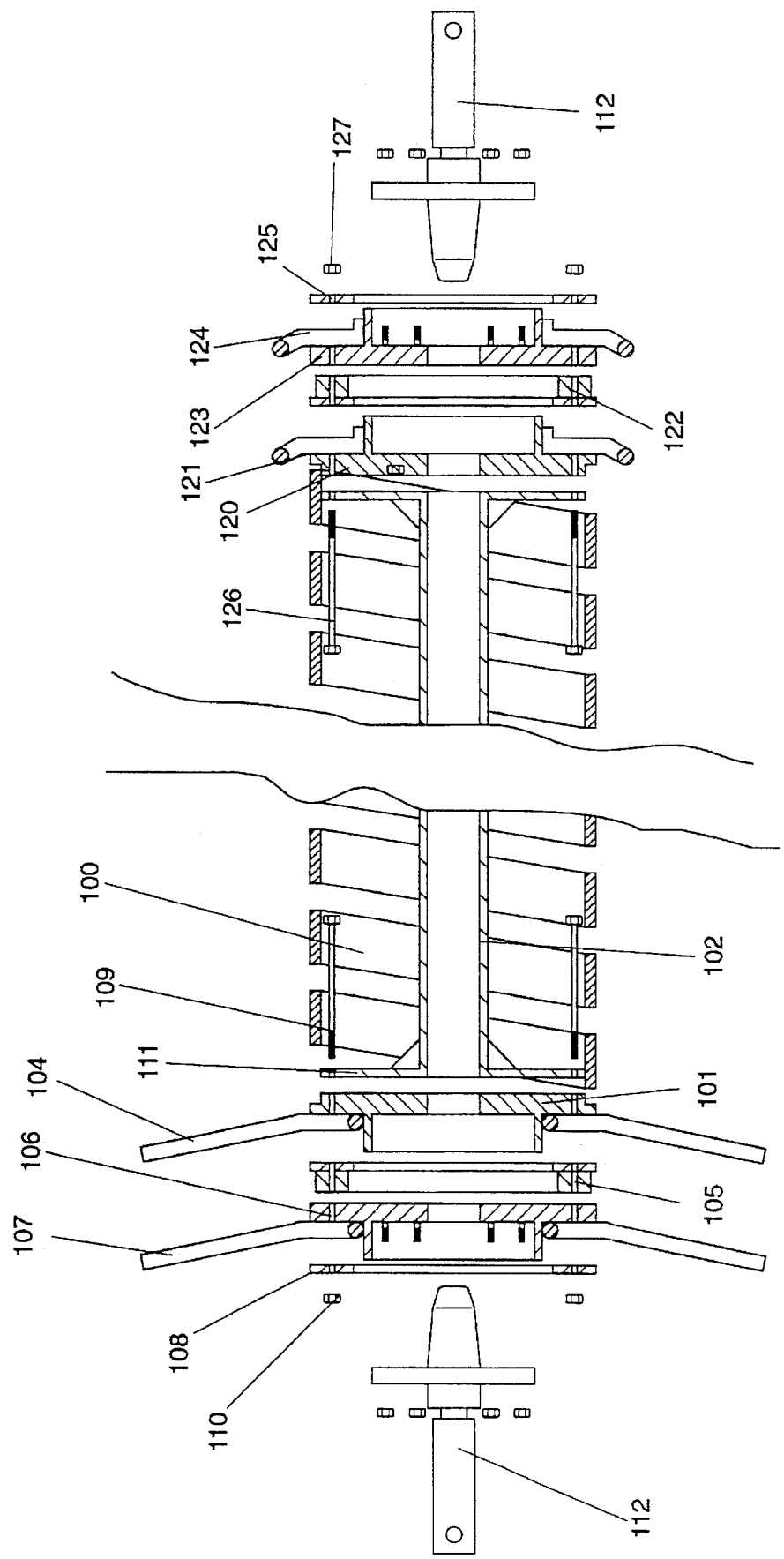
Figure 11:
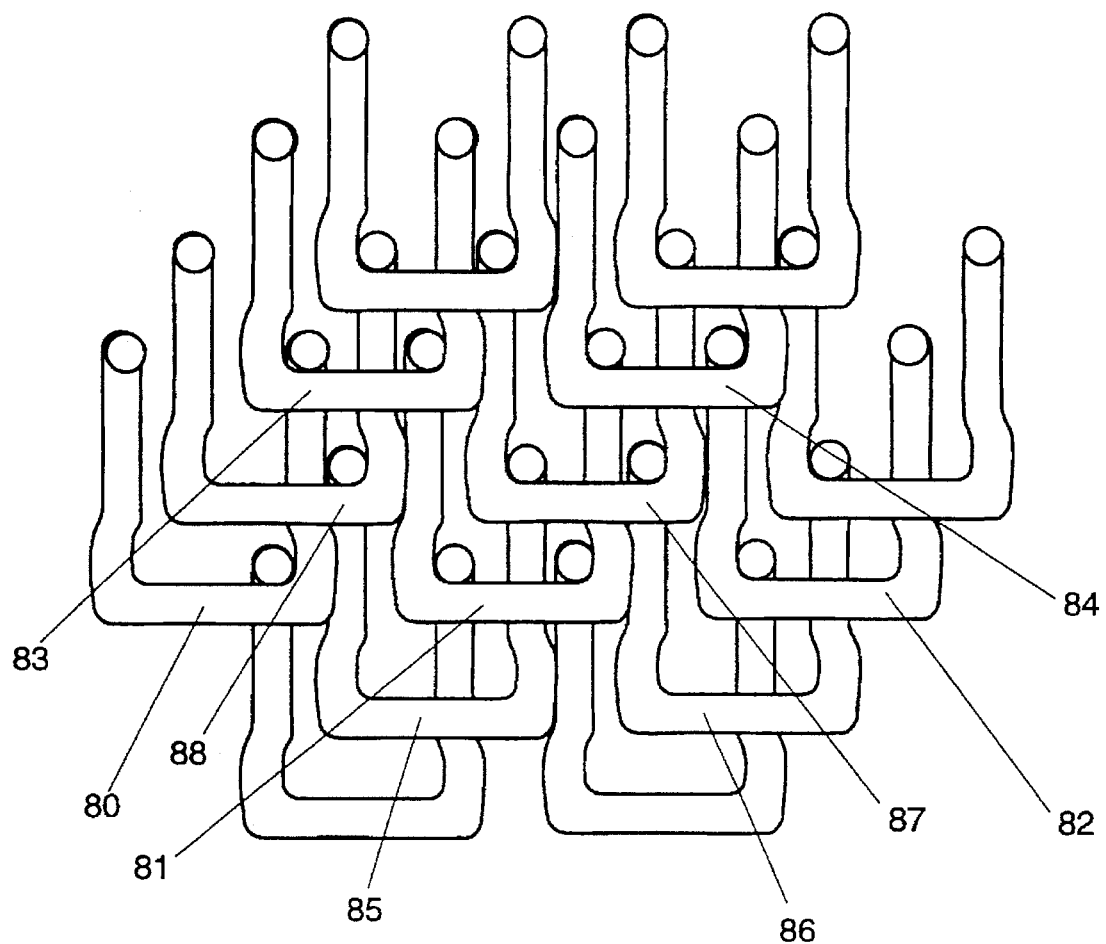
Figure 12:
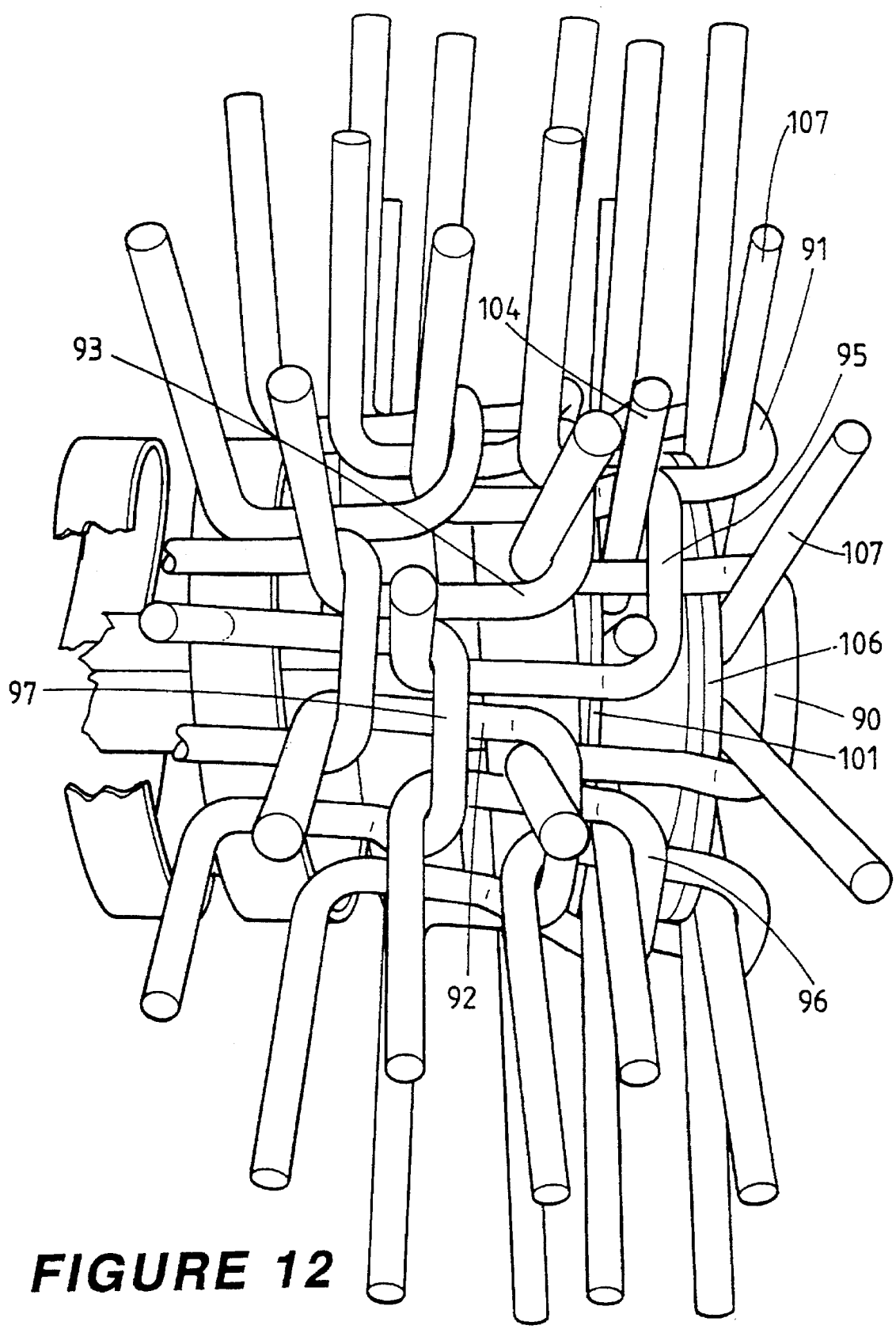

In the drawings,

FIG. 1 shows a general view of a ground working tool according to one embodiment of the invention, FIG. 2 shows one embodiment of a cultivating element of the present invention, FIG. 3 shows an alternative embodiment of a cultivating element of the present invention, FIG. 4 shows an assembly of a number of cultivating elements of the embodiment as shown in FIG. 2, FIG. 5 shows a detail of a number of cultivating elements of the embodiment shown in FIG. 3 linked together, FIG. 6 shows a detail of a number of cultivating elements on a portion of a cylindrical support, FIG. 7 shows a complete cross sectional view of a ground working tool according to one embodiment of the invention, FIG. 8 shows a detail of an end view of the ground working tool shown in FIG. 7 showing how the cultivating elements are mounted at one end, FIG. 9 shows a detail of an end view of the ground working tool shown in FIG. 7 showing how the cultivating elements are mounted at the other end, FIG. 10A shows an exploded cross sectional detail of one end construction of the ground working tool according to an alternative embodiment, FIG. 10B shows an exploded cross sectional detail of the other end construction of the ground working tool according to the embodiment shown in FIG. 10A, FIG. 11 shows an assembly of cultivating elements with a double bank of cultivating elements linked together which is adapted to be used with the embodiment as in FIG. 10A and B, and FIG. 12 shows a detail of one end of a ground working tool with the double bank of cultivating elements mounted thereon.

Now looking in detail at the drawings and in particular the embodiment shown in FIG. 1 there is shown a general view of an elongate ground working tool according to this invention. The ground working tool comprises essentially a cylindrical support 1 upon which are supported a number of individual cultivating elements 2 in what may be termed a chain mail type assembly with each cultivating element 2 presenting two tines 3 so that the outer surface of the ground working tool has the appearance of a number of spikes extending outwards. Terminal loops 4 which will be explained in more detail with respect to later drawings hold the final cultivating elements 7 onto the end assembly generally shown as 5 of the ground working tool. An axle 6 extends out of the end of the ground working tool and is adapted to be mounted to a chassis so that the ground working tool can be rolled along the ground.

FIG. 2 shows a first embodiment of a cultivating element according to this invention. In this embodiment the tool element 10 has a substantially circular body portion 11 which extends for about 270° of a circle. At one end of the body portion 11 a tangential arm 12 extends and at the other end of the body a tangential arm 13 extends. The arm 13 crosses over the arm 12. Beyond the crossing point of the arms 12 and 13 there is a bend in each of the arms at substantially right angles and out of the plane of the body portion so that tines 14 and 15 are formed. The tines 14 and 15 may be splayed slightly outwards from each other so that when the assembly is spread over the surface of a cylinder they project substantially radially outwards.

An alternative embodiment of cultivating element is shown in FIG. 3. In this embodiment of cultivating element 20 there is a substantially U-shaped body having a base portion 21 and side legs 22 and 23. The side legs are bent at 24 and 25 upwards and outwards to form a kink in the legs just before the base 21 so that the base 21 is raised above the plane of the side legs 22 and 23 a sufficient height so that a side leg of another tine can pass under the base 21 as will be seen in the later drawings showing an assembly technique. The distance between the legs at the base end is slightly greater than the distance between the legs at the tine end. Each of the side legs 22 and 23 has a bend in it out of the plane of the legs so as to form tines 26 and 27 respectively extending up from the legs 22 and 23. The angle of the bend may be in the range of from 60° to 90° to the legs. The tines 26 and 27 may be splayed slightly outwards from each other so that when an assembly of cultivating elements is placed over the cylindrical surface of a cylinder then each of the tines projects substantially radially outwards.

FIG. 4 shows a schematic plan view of an assembly of cultivating elements of the type shown in FIG. 2. Each cultivating element 10 has the arms 13 and 12 of two adjacent cultivating elements extending under its circular body portion 11 with their tines 15 and 14 extending up through the centre of the circular portion. The tines 14 and 15 of the cultivating element 10 themselves extend up underneath the bodies of two adjacent cultivating elements 10. The length direction of the cylindrical support is shown by the arrow 16 and the circumference is shown by the arrow 17. With the whole arrangement assembled around the cylindrical support and kept in tension along the length of the cylindrical support from the ends then the chain mail type assembly will stay together and provide a cultivating tool, FIG. 5 shows an assembly of the cultivating elements of the type shown in FIG. 3. Each cultivating element 20 has tines 26 and 27 of two adjacent cultivating elements extending up into the corners between the side legs 22 or 23 and the base 21 and its tines extending up through the corners of further adjacent cultivating elements. The length direction of the cylindrical support is shown by the arrow 28 and the circumference is shown by the arrow 29. Once again by this arrangement a linked arrangement of cultivating elements both around the periphery of a cylindrical support and along the length of the cylindrical support may be formed.

It will be realise that the dimensions of the cultivating elements and the cylindrical support may be selected to enable a desired number of cultivating elements to fit around and along the cylindrical support.

In one embodiment the cylindrical support may be a coil spring manufactured from flat bar steel with the steel used on the flat so that a substantially cylindrical outer surface is provided to support the individual cultivating elements.

FIG. 6 shows a portion of the helical coil spring 30 with part of three successive turns shown which present an outer smooth cylindrical surface upon which are supported a number of cultivating elements 21:). The underside of the legs 22 and 23 rest onto the cylindrical support and can be arranged to rest on successive coils of the spring. The tines 26 and 27 extend substantially radially outwards although at an angle slightly in the length direction of the cylindrical support.

FIG. 7 shows a cross-sectional view of an entire ground working tool according to this invention particularly showing a telescoping axle of one embodiment of the invention. The end assembly 60 provides a mounting for the first cultivating elements and a stub axle assembly 62. Terminal loops 4 provide an aperture through which the tines of the first cultivating elements 20 pass. Clamping plate 50 enables the terminal loops 4 to be retained onto the end assembly. The end assembly 61 similarly has mounting for the last cultivating elements and a stub axle assembly 62. End tines 34 are of a substantially V-shape and provide legs onto which the final cultivating elements can be looped. Clamping plate 38 mounts the end tines 34 onto the end assembly. Between the end assemblies 60 and 61 is an axle assembly 32, 33 which is in essentially two parts with one part joined to each end plate. A first part is an outer tube 33 joined to the end plate 45 with an inner diameter substantially same as the outer diameter of an inner axle tube 32 which extends from the end plate 31. A spring 64 is within the axle 33 and the end of axle tube 63 which is away from the end plate 31 bears against the spring 64. The other end of the spring 64 bears against the end plate 45. The spring 64 is adapted to provide an extension force between the end assemblies to maintain the integrity of the links between the cultivating elements. A special tool may be provided (not shown) to draw the end assemblies closer together against the tension in the spring 64 to loosen off the tension in the links between the cultivating elements to originally assemble the cultivating elements or to replace a damaged one. By the addition or removal of spacers or shims (not shown) at the ends of the spring 64 the tension in the spring and hence the tension in the links between the cultivating elements may be varied to change the flexibility of the tool as a whole and hence its ground following ability.

FIG. 8 shows an end view of the end assembly 60. Clamping plate 50 clamps a number of terminal loops 4 against the end plate 47. Tines 26 and 27 from two adjacent cultivating elements extend through one terminal loop 4. Bolts 70 are provided to mount the stub axle assembly 62 to the end assembly.

FIG. 9 shows an end assembly 61 in which the clamping plate 38 clamps end tines 34 which are a V-shape onto the end plate 46. A base 21 of a tine is looped over adjacent end tines 34. Bolts 71 allow the stub axle assembly 62 to be mounted to the end assembly 61. The legs of the end tines 34 are extended so that they provide operational digging elements in use.

As best can be seen in FIG. 9 the distance 65 on a cultivating element 20 between the legs at the base end of the legs is greater than the distance 66 between the legs at the tine end.

FIG. 10, 11 and FIG. 12 show an alternative arrangement of ground working tool according to this invention in which there are two sets of cultivating elements mounted onto a cylindrical support. FIG. 10A and B show suitable end assemblies for this embodiment. FIG. 11 shows the assembly shown laid out flat and FIG. 12 shows a close up particularly of the end mounting assembly.

FIG. 10A shows a first end assembly of a ground Working tool according to a this embodiment of the invention. The helical spring 100 terminates in a first end plate 101. Within the helical spring is an axle 102. The end plate 101 has an extra tine 104 mounted onto it. The base of the first cultivating element is adapted to loop onto the tine 104. This embodiment of ground working tool has a double assembly of cultivating elements and hence there is a spacer 105 and then a second end plate 106 with a further end tine 107 upon which is to be looped the base of the cultivating elements of the second set. The spacer 105 acts as a clamping plate for the end tines 104 and a clamping plate 108 clamps the end tines 107. A bolt 109 and nut 110 is used to clamp the end plate 111 of the axle 102 right through to the clamping plate 108. A stub axle and bearing assembly 112 is adapted to be mounted into the end plate 106 so that the ground working tool can be mounted onto a chassis for rotation.

FIG. 10B shows the end assembly at the other end of the ground working tool. Once again the spring 100 terminates in a first end plate 120. A terminal loop 121 is adapted to be clamped to the end plate 120 by means of spacer 122 and a tine of a cultivating element can be looped under a terminal loop 121. The second end plate 123 again has a terminal loop 124 and a clamping plate 125. The spacer 122 provides the spacing between the first set of tines and the second of tines in the double tine assembly. A bolt 126 and nut 127 is used to clamp the plate 128 of the axle 102 right through to the clamping plate 125. Once again there is a stub axle assembly 112 which in mounted into the end plate assembly to the end plate 123 to enable the ground working tool to be mounted to a chassis for rotation.

Looking at FIG. 11 it will be seen that a first set of cultivating elements 80, 81, 82, 83 and 84 are linked together in a first assembly and a second assembly of cultivating elements 85, 86, 87 and 88 are linked together in a second assembly. Although the leg portions of each assembly interweave with the base portions of the other assembly, there is no physical connection between the first assembly and the second assembly with each assembly being independently mounted to the respective end plates.

This double bank arrangement is particularly shown in FIG. 12 in which a first set of tines 90, 91, 92 and 93 are mounted to end tine 107 on the outer end plate assembly 106 and a second set of tines 95, 96, 97 for instance are mounted to end tine 104 on the inner end plate assembly 101. Similarly at the other end the separate tine assemblies are mounted to separate end assemblies (not shown).

The advantage of using two sets of cultivating elements is that for a given size of ground working tool twice as many tines extend from the tool which will give greater ground working ability and a greater weight which will be useful in some soils.

Preferably each cultivating element is constructed from steel rod bent to the desired shape and in one preferred embodiment the steel rod may have a diameter of 25 mm. The rod may be suitably tempered before or after forming to give sufficient resiliency and hardness for efficient ground working and resistance to wear.

Overall it will be seen that by this invention, there is provided a ground working implement or rolling trash cultivator which by use of a cylindrical support can support a greater number of tines in a group around its periphery than has hitherto been possible so that the angle of entry and exit of the tines from the ground does not cause collection of trash and so that the weight of the tines and the cylindrical support can assist with the tines entering the ground to give a good cultivation effect.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

I claim:

1. An elongate ground working implement rotatably supported about a longitudinal axis, said ground working implement comprising:

an elongate cylindrical support having longitudinal ends, a plurality of interlocking cultivating elements arranged on a peripheral cylindrical surface of the cylindrical support, at least one tine extending from each cultivating element, and a support configured to support the cylindrical support rotatably about the longitudinal axis, wherein the peripheral cylindrical surface of the cylindrical support is flexible or resilient in a radial direction.

2. An elongate ground working implement as in claim 1 wherein the cylindrical support is a helical coil spring.

3. An elongate ground working implement as in claim 2 wherein coils of the helical coil spring are made from a flat metal bar having flat surfaces so the peripheral cylindrical surface is provided by the flat surfaces of the metal bar to give support for the cultivating elements.

4. An elongate ground working implement as in claim 1 further including an axle within the cylindrical support and the cylindrical support being mounted at respective of said ends to the axle so that the cylindrical support between said ends is free to flex to allow ground following during use.

5. An elongate ground working implement as in claim 4 wherein the axle includes means to allow for the application of an extension force between ends of the axle so as to apply tension to the plurality of cultivating elements on the cylindrical support.

6. An elongate ground working implement as in claim 5 wherein the means to allow for the application of an extension force between ends of the axle comprise a telescoping axle and a compression spring within the telescoping axle.

7. An elongate ground working implement as in claim 1 wherein each of the cultivating elements is interconnected with four adjacent cultivating elements around the circumference of the cylindrical support and along the length of the cylindrical support to provide an integral structure of cultivating elements over the peripheral cylindrical surface of the cylindrical support.

8. An elongate ground working implement as in claim 1 further including end assemblies at each end of the cylindrical support, said cultivating elements being arranged in groups with a first group at one end of the cylindrical support and a last group at the other end of the cylindrical support, the end assemblies including means to retain the first and last groups of cultivating elements.

9. An elongate ground working implement as in claim 1 wherein each cultivating element comprises a substantially U-shaped portion and two tines, said U-shaped portion including a base portion and two leg portions and defining a plane, said two tines extending from respective of said leg portions at an angle to said plane.

10. An elongate ground working implement as in claim 9 wherein said base portion of the substantially U-shaped portion is bent out of the plane so as to allow one of the leg portion of an adjacent cultivating element to pass underneath when mounted onto the cylindrical support.

11. An elongate ground working implement as in claim 9 wherein the distance between the leg portions at the base is greater than the distance between the leg portions at the tines.

12. An elongate ground working implement as in claim 1 wherein each cultivating element comprises a circular loop portion, two tangential legs extending from the loop portion and crossing each other and with each leg including a bend out of the plane of the loop portion beyond the crossing point with each portion of the leg beyond the bend comprising the tine.

13. An elongate ground working implement as in claim 1 wherein there are from four to ten cultivating elements around the circumference of the cylindrical support at each position along the length of the cylindrical support.

14. An elongate ground working implement as in claim 1 wherein the plurality of cultivating elements on the peripheral cylindrical surface of the cylindrical support comprises a double bank of cultivating elements so as to provide more ground working tines extending from the tool.

15. An elongate ground working implement as in claim 14 wherein each cultivating element comprises a substantially U-shaped portion and two tines, said U-shaped portion including a base portion and two leg portions and defining a plane, said two tines extending from respective of said leg portions at an angle to said plane and wherein said base portion of the substantially U-shaped portion is bent out of the plane so as to allow the leg portions of an adjacent cultivating element of both banks of cultivating elements to pass underneath when mounted onto the cylindrical support.

16. An elongate ground working implement as in claim 15 wherein there are from four to ten cultivating elements in each bank of cultivating elements around the circumference of the cylindrical support at each position along the length of the cylindrical support.

17. An elongate ground working implement as in claim 10 wherein the distance between the leg portions at the base is greater than the distance between the leg portions at the tines.

* * * * *